Jan. 24, 1961     L. E. DUNBAR ET AL     2,968,950
ACCELEROMETER
Filed July 16, 1958     3 Sheets-Sheet 1
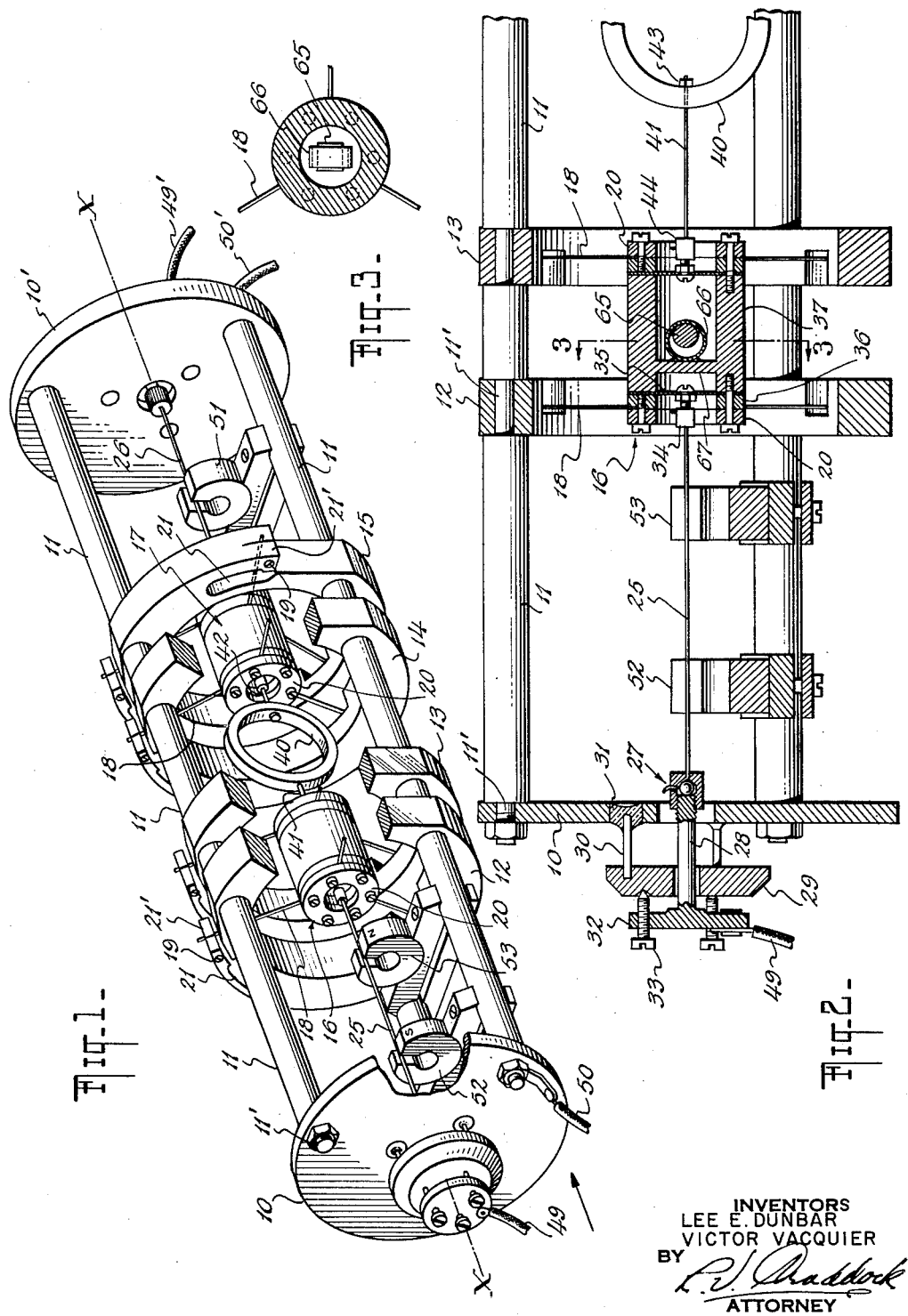
INVENTORS
LEE E. DUNBAR
VICTOR VACQUIER
BY
ATTORNEY

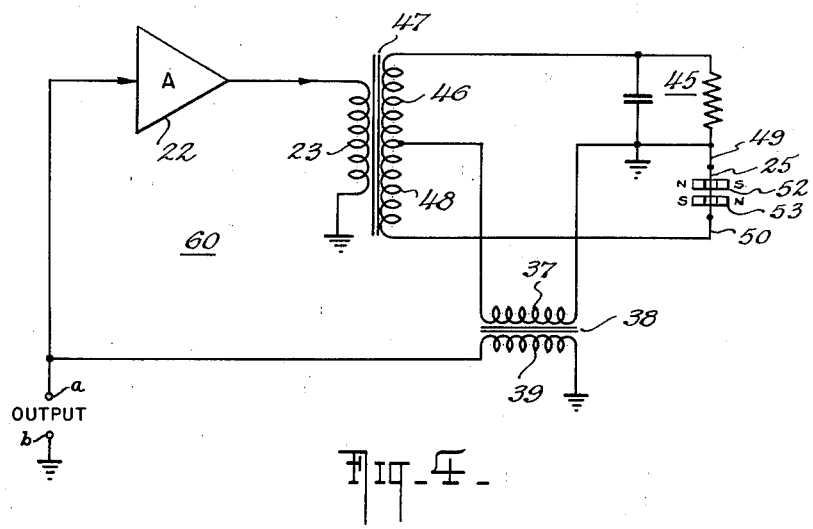
Fig-4-
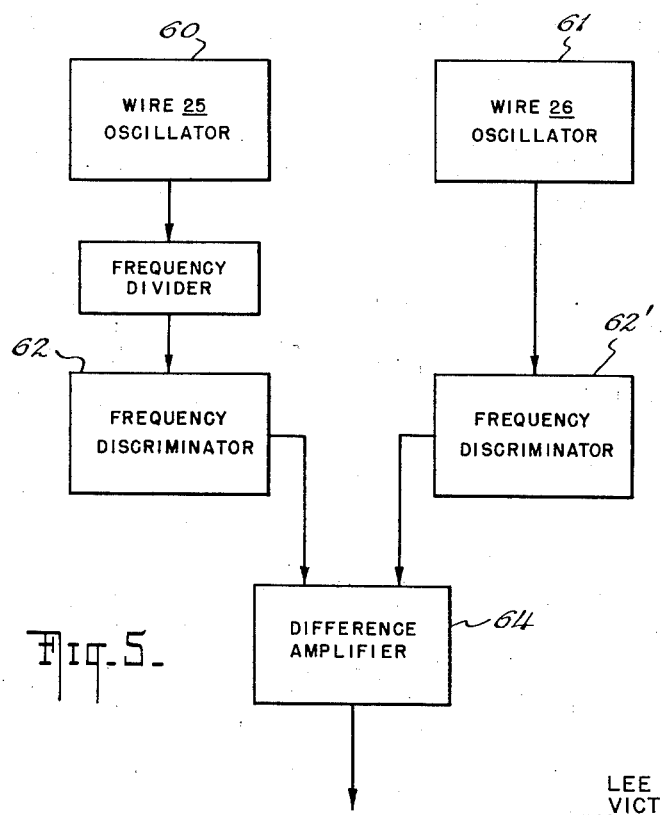
Fig-5-

Jan. 24, 1961    L. E. DUNBAR ET AL    2,968,950
ACCELEROMETER

Filed July 16, 1958    3 Sheets-Sheet 3

INVENTORS
LEE E. DUNBAR
VICTOR VACQUIER
BY
ATTORNEY

United States Patent Office 2,968,950
Patented Jan. 24, 1961

2,968,950
ACCELEROMETER

Lee E. Dunbar, Plainview, N.Y., and Victor Vacquier, La Jolla, Calif., assignors to Sperry Rand Corporation, a corporation of Delaware Filed July 16, 1958, Ser. No. 749,008

10 Claims. (Cl. 73—510)

The present invention relates generally to force-measuring apparatus and more particularly to apparatus for measuring accelerations experienced by a body or craft on which the apparatus is mounted. More specifically, the invention is concerned with improvements in accelerometer devices of the type in which a mass is supported by one or more wire filaments, and in which the filament or filaments are placed under tension and electrically vibrated at the natural frequency of the filaments, changes in tension thereof produced by the mass movement causing a corresponding change in the vibration frequency whereby said frequency change is proportional to the acceleration acting on the supported mass.

While accelerometer devices of this type have been known for some time, they have, so far as we are aware, not been suited or capable of measuring very small values of acceleration. The reason that such accelerometers have not been capable of measuring very low values of acceleration is that mechanical coupling occurs between the vibrating wires which cause them to oscillate in synchronism, thereby producing an undesirable dead spot in the output.

By the present invention we have overcome this disadvantage of prior vibrating accelerometers by greatly reducing or substantially eliminating such mechanical coupling between the vibrating wires thereby allowing the accelerometer to provide acceptable outputs down to very low values of acceleration, for example, on the order of .000005 g. According to the present invention, a seismic mass is connected at each of its ends by tensioned wires extending therefrom to a rigid support member or housing thereby resiliently supporting said mass along the sensitive axis in said housing end walls. Support of the mass laterally of the sensitive axis may be provided by flexural ligaments connecting the mass with the housing side walls. The wires are electrically vibrated as by suitable oscillator circuits at frequencies dependent upon the tension applied thereto and suitable frequency-detector circuits responsive to the outputs of the wires provide the output measure. Mechanical intercoupling between the two wires is substantially eliminated through the provision of mechanical filter circuits, such as a mechanical band rejection filter which is tuned to the frequency at which the wires are vibrated or by electromechanical means incapable of transmitting vibrations.

The filter device or devices of the present invention may constitute part of the seismic mass. On the other hand, the seismic mass may constitute two separate masses having their opposite ends connected to the vibrating wires and having their adjacent ends connected by means of a mechanical or electromechanical spring for the purpose of maintaining tension on the wires, the structure compensating for changes in ambient temperature conditions surrounding the accelerometer to the extent that it prevents drifts of the instrumental zero.

A further novel aspect of the accelerometer of the present invention resides in the manner in which the wires are vibrated. Instead of vibrating each wire at the same frequency, one wire may be vibrated at a multiple or preferably a non-integral ratio of the nominal or natural frequencies of vibration of the wires which thereby further reduces vibratory intercoupling effects between the wires, suitable frequency multipliers and/or dividers being incorporated in the output circuitry for converting the frequencies of vibration of the wires to a normally common frequency for direct frequency comparison purposes.

Inasmuch as the measured acceleration is detected as a change in frequency between the two wires, a direct measure of acceleration is available by detecting the difference frequency. Furthermore, since variable alternating currents are involved, the frequency of vibration of each wire may easily be converted to pulses and hence such outputs are admirably suited to digital computing apparatus.

From the foregoing, it will be clear that one of the primary objects of the present invention resides in the provision of an improved acceleromter of the vibrating wire type.

Another object of the present invention resides in the provision of an improved accelerometer of the vibrating wherein two wires, each responsive to acceleration forces acting on a mass interconnected therebetween, serve to change the frequency of one wire with respect to the other to thereby provide a measure of the acceleration experienced by the mass.

Still another object of the present invention is the provision of a vibrating wire accelerometer of the foregoing character wherein vibration intercoupling between the vibrating wires is greatly reduced or substantially eliminated.

Other objects and advantages of the present invention not at this time particularly enumerated will become clearly apparent as the description of a preferred embodiment of the invention proceeds, reference being made to the accompanying drawings wherein, Fig. 1 is a perspective view of a linear accelerometer built in accordance with the teachings of the present invention with the protective outer shell or casing removed;

Fig. 2 is a vertical sectional view of one half of the accelerometer illustrated in Fig. 1;

Fig. 3 is a detailed sectional view of one of the seismic masses of the accelerometer of Fig. 1 taken along line 3—3 of Fig. 2;

Fig. 4 is a schematic wiring diagram of an oscillator circuit suitable for use in vibrating the wires of the accelerometer and providing an output proportional to such vibration;

Fig. 5 is a schematic block diagram of a circuit suitable for use in providing an output in accordance with accelerations sensed by the accelerometer;

Figure 6:
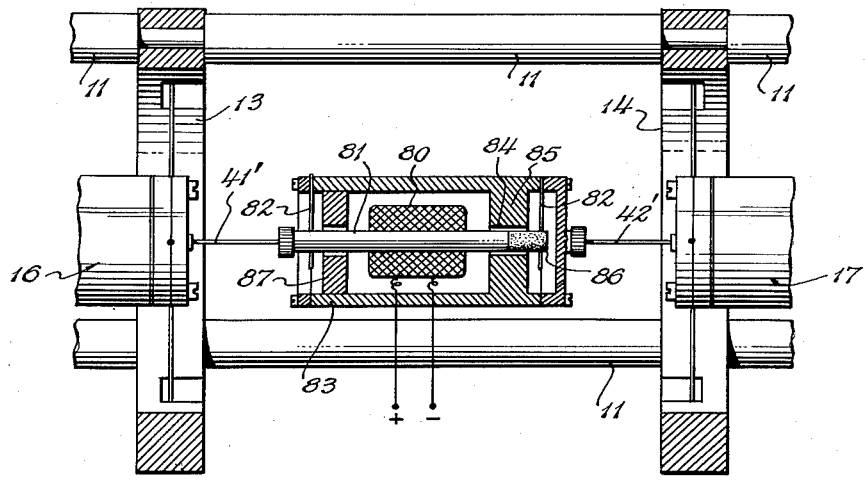
Fig. 6 is a vertical sectional view of a modification of the accelerometer of the present invention.

Referring now to Fig. 1, the accelerometer housing comprises an open frame-like structure from which the sensitive elements are suspended and which may, under operating conditions, be completely enclosed and protected as by a cylindrical can or sleeve (not shown). The housing includes end plates or end walls 10, 10' rigidly interconnected by means of connecting rods 11 secured to the end walls by means of suitable stud and nut connections 11' (Fig. 2). The support rods 11 are preferably arranged adjacent the periphery of end plates 10, 10' at points substantially 180° apart. Intercoupling connecting rods 11 are rings 12, 13, 14, and 15, which may be looked upon as the housing side walls, which serve to laterally support the sensitive elements of the accelerometer, as will be further described. While the housing of the accelerometer of Fig. 1 consists of an open framework designed for ease of manufacture and assembly, it should be understood that this type of housing is merely exemplary and, if desired, may take any number of different forms.

The acceleration-sensitive mass of the embodiment of the invention illustrated in Fig. 1 comprises a pair of seismic members 16 and 17 having a generally cylindrical configuration. Each cylinder is supported laterally from the housing frame by means of flexural ligaments 18. These ligaments may constitute fine metallic wires or, preferably, thin, flat metallic ribbons or strips. As illustrated, four groups of three strips each are provided, two groups for each mass, each strip of each group being arranged to extend radially from the masses 16 and 17 to the frame members 12—15 and spaced 120° apart. The strips or ligaments must be perpendicular to the x—x axis of the instrument for reasons to be described. One end of each strip group is clamped in one of the lateral support rings 12—15 as by means of suitable clamping screws 19, and the other end thereof is clamped in the seismic members as by means of clamping rings 20. As clearly illustrated in Fig. 1 and particularly with reference to ring 15, the frame rings 12—15 are cut out as at 21, at 120° intervals therearound, the construction being such that the filaments 18 may be maintained under tension by flexure of a free end 21' formed by such cutting. It will be noted that cylindrical masses 16 and 17 and their supporting ligaments 18 after assembly are so arranged that their axes of symmetry are coaxial, and preferably this common axis lies along the axis of symmetry x—x of the housing. This axis is the sensitive axis of the instrument, i.e., the axis along which the instrument will measure accelerations.

It is important to note that the radially extending supporting ligaments 18 for the masses 16 and 17 must be precisely normal to the axis x—x and hence normal to the wires 25 and 26. If the ligaments are not precisely normal to the sensitive axis of the instrument, there will exist components of the supporting radial tension which lie in the direction of the axis and would produce a non-linearity in the output of the instrument. Furthermore, if the ligaments are precisely arranged perpendicular to the wires 25 and 26 they will not contribute any spring restraint to the limited axial motion of the masses, since it is known that the slope of the force-displacement curve of a stretched ligament is zero at the origin (the displacements herein involved being infinitesimal). Means have been provided for precisely adjusting the axial position of the masses 16 and 17 with respect to the housing to thereby achieve the above perpendicularity between the ligaments 18 and the x—x axis as will be described.

The vibrating elements of the accelerometer constitute a pair of wires 25 and 26 preferably of equal length, each having one of its ends tightly secured to opposed ends of the respective masses 16 and 17 and the other end thereof rigidly secured in end plates 10, 10', respectively. The construction is more clearly illustrated in Fig. 2 wherein the clamping structure for each end of the wire 25 is clearly illustrated. As shown with respect to the end of wire 25 connected with the end plate 10, a ball and socket clamp 27 is employed. The ball and socket clamp is preferable for the reason that it provides a very tight grip on the wire, and also the closely fitting socket or bushing thereof serves precisely to define its length and to accurately locate the wire on the x—x axis of the instrument. This same type of clamp may be used for all other ends of the wires 25 and 26. A mounting disc 29 forms part of the wire mounting structure at the end plates 10 and 10', only one of which can be seen in Figs. 1 and 2—the other being identical. This disc is supported on the end plate 10 as by means of struts 30. It will be noted that struts 30 are mounted in glass beads 31 in the end plate 10, thereby providing an electrically insulating connection therebetween. Passing through a central hole in disc 29 is a rod 28 having a flange 32 in which adjusting screws 33 are threaded, the ends thereof being adapted to rest in suitable recesses in the plate 29. The end of rod 28 carries the wire-clamping ball and socket 27. The foregoing means for securing one end of the wire 25 with respect to the end wall 10 not only provides for an initial adjustment of the tension in the wire 25 as by means of the set screws 33 but also for the precise alignment of the sensitive elements of the instrument within the housing. Still referring to Fig. 2, the other end of wire 25 is secured to one end of the mass 16 by means of a further ball and socket connection 34 which may be similar in construction to the connection 27. However, this end of wire 25 is resiliently secured to the mass 16 as by means of a diaphragm 35 which is clamped between clamping rings 36 and a main cylindrical body portion 37 of the mass 16. The two ends of wire 26 are secured to the mass 17 and end wall 10' in exactly the same manner as described above with respect to wire 25.

Coupled between adjacent ends of masses 16 and 17 is a resilient means adapted to react solely between the masses and wires 25 and 26 and which therefore will apply equal tensions between the filaments 25 and 26 since the ligaments 18 contribute no force along the sensitive axis. In Figs. 1 and 2, this resilient means comprises a circular or annular spring 40 coupled between said adjacent mass ends as by means of suitable wires 41, 42. One end of each of the wires 41, 42 is threaded and connected to the spring as by means of suitable nuts 43 and each end is connected to adjacent ends of masses 16, 17 through a resilient diaphragm as by clamping means 44, the construction being the same as that at the other ends of the masses 16 and 17. It will be appreciated that the illustrated configuration of the spring 40 is only exemplary and the spring may actually take any of a number of forms provided it possesses the proper spring rate. For example, a coil spring could just as well be employed.

From the foregoing description, it will be clear that the masses 16 and 17 constitute a member which is mounted in the housing and is responsive to acceleration forces acting along the axis x—x of the instrument, these masses being laterally supported in the housing by means of ligaments 18 and axially restrained along the sensitive axis by means of wires 25 and 6, normally equal tension being maintained on the wires 25 and 26 as by means of a resilient coupling, such as spring 40, which tend to pull the masses 16 and 17 together, the opposed ends of wires 25 and 26 being adjustably secured in the housing end walls 10 and 10' so that the entire assembly consisting of wires 25 and 26, masses 16 and 17, and spring 40 may be accurately axially aligned within the housing to thereby effect normalcy between the ligaments 18 and the sensitive axis x—x of the instrument.

In accordance with the present invention, electrical means are provided for vibrating the filaments at frequencies dependent upon the respective tensions applied to the wires 25 and 26 either as a result of the tension adjustment 33 under zero acceleration conditions or as a result of an acceleration acting on the masses 16 and 17 along the sensitive or x—x axis. This vibrating means includes magnetic means, such as permanent magnets 51, 52, 53, fixedly supported on the housing rods 11 and so aligned with respect to the wires as to produce strong magnetic fields at right angles thereto. Since the oscillator circuits 60, 61 for each wire are substantially identical, only one will be described in detail. Electrically connected with wire 25, for example, is a bridge-type oscillator 60, the circuit of which is illustrated schematically in Fig. 4, a similar oscillator 61 being coupled with wire 26. As shown in Fig. 4, the wire 25 constitutes one arm of a bridge network consisting of wire 25, resistor-capacitor network 45, one half 46 of the secondary winding of input transformer 47 and the other half 48 of the secondary winding of transformer 47, the output of the bridge being supplied across the primary winding 37 of output transformer 38. The secondary winding 39 of transformer 38 is connected through a suitable, preferably transistor, amplifier 22 having its output connected to the primary 23 of transformer 47. As described above, the one end of wire 25 is insulated from the end plate 10 as by means of glass beads 31. An electrical connection may thus be made as by lead 49 directly connected to the flange 32 (Figs. 1 and 2). Since the other end of the wire 25 is not in any way electrically insulated from the housing frame, another lead 50 of the oscillator network may be connected directly to this frame, as shown.

In accordance with an object of the present invention, one of the wires is vibrated at a frequency of the vibration different from that of the other for the purpose of further reducing vibratory intercoupling between the wires. In the embodiment of the invention illustrated in Fig. 1, the wire 25 is vibrated at twice the frequency of wire 26. However, it will be understood that the 2:1 ratio illustrated is only exemplary since it is preferable to vibrate the wires at frequencies such that their ratio is a non-integral ratio of the natural frequency of vibration of the wires, such as at a 3 $f$:2 $f$, 4 $f$:3 $f$, etc., ratio, where $f$ is the natural frequency of vibration of the wires. In the illustrated embodiment, one magnet 51 is magnetically coupled with wire 26 while two magnets 52, 53 are magnetically coupled with wire 25. Magnet 51 is clamped on rods 11 of the housing frame in such a manner that the magnet poles lie closely adjacent or embrace the wire 26, and is axially located midway between the points of suspension of the wire 26 so that it vibrates in the fundamental mode $f$. Similarly, two magnets 52, 53 are magnetically coupled with the wire 25, the magnet 52 being clamped to the frame rods 11 at such a position that its poles lie closely adjacent the wire and axially spaced therealong as near one-quarter of the distance between its one end 27 and the other end 34 of wire magnet 25. The magnet 53 is similarly clamped to housing rod 11 and located as near three-quarters of the distance between the clamps 27 and 34 so that the wire vibrates in the first harmonic mode of $f$ or at a frequency of 2 $f$.

Vibration of the wire 25, for example, in the field of the magnets 52, 53 will produce a current in the wire having a magnitude and frequency proportional to such vibration. This generated current momentarily unbalances the bridge and an output appears across secondary 39 of transformer 38 which is proportional to the frequency of vibration of the wire. This output is fed back regeneratively through amplifier 22 and input winding 23 of transformer 47 to thereby produce a current through wire 25 of a magnitude and frequency such as to drive the wire towards its natural frequency and thereafter to sustain the vibration thereof at its natural frequency. If the natural frequency of the wire should change as by a change in its tension, the vibration of the wire in the magnetic fields of the magnets will again produce a back E.M.F. in the wire which will effect a change in the impedance of the wire and therefore will unbalance the bridge again and produce a regenerative feedback signal proportional to such unbalance. The resulting change in the input of the bridge will be in such a direction and magnitude as to again produce an in phase E.M.F. in the wire 25 thereby rebalancing the bridge at the new vibration frequency of the wire. The output of the oscillator of Fig. 4, which may be taken across the points $a$, $b$ in Fig. 4, is at all times proportional to the frequency of vibration of the wire and varies in accordance with changes in the frequency of vibration of the wire.

One form of output circuitry for the accelerometer of the present invention is illustrated in the block diagram in Fig. 5. This circuit provides an analog output proportional to acceleration. The wire oscillator of Fig. 4 is illustrated at 60 and supplies in its output an alternating voltage proportional to the frequency vibration of wire 25. An oscillator 61, which may be the same as that illustrated in Fig. 4, is coupled with the wire 26 and supplies in its output an alternating voltage proportional to the frequency vibration of the wire 26. As above stated, the frequency of vibration of the wire 25 is normally twice that of wire 26 and in order more simply to obtain a frequency comparison, the output of oscillator 60 is passed through a frequency divider 63 to thereby put its output in the same frequency range as the output of wire oscillator 61. The output frequencies of the respective oscillators 60 and 61 are passed through frequency discriminators 62, 62', each of which may provide in its output a D.C. voltage proportional to the frequency of its input. Thus, by comparing the relative magnitudes of these D.C. outputs as by means of a difference amplifier 64, a direct measure of the acceleration is provided.

In accordance with an object of the present invention, further means is provided for substantially reducing or eliminating any vibration coupling between wires 25 and 26 thereby enabling extremely low values of acceleration to be measured. The means by which this is accomplished is illustrated clearly in Fig. 2 wherein the constructional details of mass 16 is illustrated, it being understood that the construction of mass 17 is identical. Within a central bore in the mass 16 is a further mass 65 flexibly or resiliently secured to a preferably rigid internal wall of the member 16 by means of a cylindrical spring 66. The mass and spring are so arranged that the mass 65 is capable of vibration along the sensitive axis of the instrument. Such construction enables the mass and spring combination 65—66 to act as a vibration energy absorber, the size and weight of mass 65 and the spring constant of spring 66 being so chosen as to absorb vibration energy at frequencies within a limited range on either side of the natural frequency of vibration of the wire with which it is coupled. Stated another way, the mass and spring constants are so chosen that they constitute a mechanical band-rejection filter tuned to the frequency of vibration of the wire with which it is associated. By this construction, mutual vibrations of the wires are attenuated in their passage through the masses 16 and 17, support wires 41, and spring 43.

The operation of the accelerometer of the present invention is as follows. Assume that the housing of the accelerometer is subject to an acceleration in the direction represented by the arrow in Fig. 1. Since the masses 16 and 17 will tend to maintain their spacial position due to their inertia, the tension in wire 25 will be increased and the tension in wire 26 will be decreased. In other words, the total tension in wire 25 will be the sum of its initial tension and the tension due to the acceleration force acting on mass 16 (and 17), and the tension in wire 26 will be the difference between the initial tension and the tension due to the acceleration force on mass 17 (and 16). Since the oscillators 60 and 61 will change their frequencies in accordance with the change in the tension of their respective wires, their respective outputs will reflect these changes in frequency, the difference therebetween being a measure of the acceleration to which the housing is subjected. The total change in the natural frequency of the wires, $\Delta f$, is equal to $f_{25} - f_{26}$, the difference frequency, and is accurately expressed mathematically as a power series in $$\frac{Ma}{T_0}$$

$$\Delta f = \frac{1}{2L}\sqrt{\frac{T_0}{m}}\left[\frac{Ma}{T_0} + \frac{1}{8}\left(\frac{Ma}{T_0}\right)^3 + \cdots\right] \quad (1)$$

This equation may be approximated for practical purposes as follows:

$$\Delta f = f_{25} - f_{26} = \frac{Ma}{2L\sqrt{mT_0}} \quad (2)$$

In the above equation, $a$ is the acceleration, M is the total mass of the separate masses 16 and 17, L is the length of each wire 25 and 26, $T_0$ is the initial tension on the wires, and $m$ is the mass per unit length of each wire. Therefore, since M, L, $T_0$ and $m$ are constants, the foregoing equation may be rewritten as follows:

$$f_{25} - f_{26} = Ka$$

Since the acceleration is proportional to the change in frequency between the two wires and the frequency of each wire is represented by the output of its respective oscillator, this change in frequency is detected by the frequency discriminators 62, 62', the D.C. outputs thereof being compared or algebraically added in difference amplifier 64 to supply a resultant output that is proportional to or is a measure of the acceleration of the housing as described above.

In Fig. 6, there is illustrated by a partial section a modification of a portion of the accelerometer illustrated in Figs. 1 and 2. In the latter figure, a spring was employed for the purpose of maintaining the tension on the wires 25 and 26 normally equal. In the modification of Fig. 6, this mechanical spring is replaced by an electromechanical spring-like arrangement. The latter arrangement is a means for substantially completely eliminating vibration intercoupling between the wires 25 and 26. In this embodiment, the tension means comprises a solenoid coil 80 wound on a core 81 of magnetizable material. Suspended therefrom, as by means of suitable flexural ligaments 82 similar to the members 18 supporting the masses 16 and 17, is a cylindrical housing 83 also of magnetic material. If desired, this housing may in turn be supported from the instrument housing frame 11 in the same manner as the masses 16 and 17. The housing is formed with an internally-extending wall 85 having a cylindrical bore therethrough adapted to freely receive an end of the core 81 to thereby define a cylindrical airgap 84 therebetween. Wires 41', 42' connect adjacent ends of masses 16 and 17, respectively, with the core member 81 and the housing 83, respectively. As illustrated by stipple shading, the core member 81 is provided with a non-magnetizable end portion 86, the joint between the core member 81 and the portion 86 thereof being disposed substantially midway between the cylindrical airgap 84. End wall 87 serves to complete the magnetic circuit. Thus, upon energization of the coil 80 by a unidirectional voltage of predetermined magnitude, a solenoidal force is exerted between the housing and the core which tends to pull the core 81 through the airgap 84, the force therefore being in a direction such as to produce a tension on the wires 41', 42' and hence through masses 16 and 17 to the wires 25 and 26.

The solenoidal force exerted between the core 81 and the housing part 85 is proportional to the space rate of change of permeance under the influence of a constant M.M.F. Therefore, the shape of the core 81 and housing part 85 is so designed that a linear rate of change in permeance with displacement is produced. Under such conditions the solenoidal force will be a constant and the spring rate of the coupler will be zero. Thus, the tension-applying means of Fig. 6 acts as an infinite spring through which longitudinal vibration of wires 25, 26 cannot be transmitted.

Figure 7:
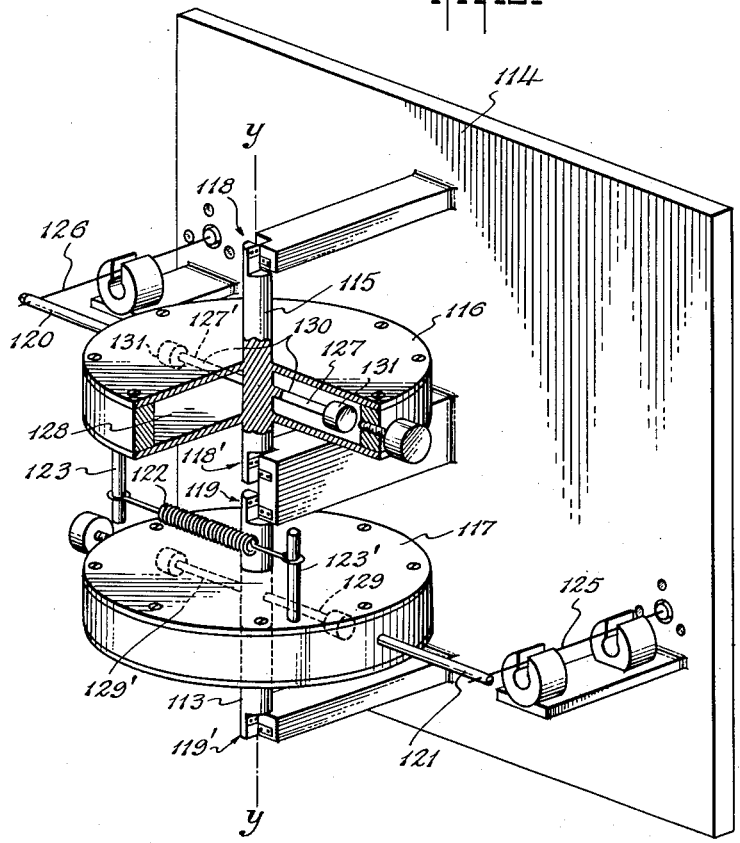
Fig. 7 is a schematic view of a further modification of the present invention adapted to sensing angular accelerations.

In Fig. 7, there is illustrated another form of an accelerometer built in accordance with the teachings of the present invention. In this form of the invention, the elements thereof are arranged such that they will respond to and provide a measure of angular accelerations of an object on which the device is mounted. In this form of the invention, the sensitive axis is designated as $y-y$, and the masses are designated 116 and 117. Also in this form of the invention, the masses 116 and 117 are cylindrical in shape and have substantial moments of inertia about the sensitive axis. The mass 116 is supported on or forms an integral part of a mounting shaft 115 supported on a base or rigid frame 114 by a frictionless suspension, such as by means of suitable upper and lower crossed, flexural suspension springs 118, 118' familiar to those skilled in the art. Similarly, the mass 117 is supported on a coaxial shaft 113 by means of conventional flexural supports 119, 119'. Supported on a radial arm 120 of mass 116 is one end of a wire filament 126, the other end of which is fixed with respect to the base 114. A fastening means similar to that disclosed in Fig. 1 may be employed for supporting the wire 126 in the base. In a like fashion, wire 125 has one end thereof secured to a radial arm 121 of mass 117 and the other end thereof fixedly secured to the base 114. Weights may be adjustably fastened to the masses 116 and 117 to counterbalance the arms 120, 121, respectively. Of course, the radial arms 120, 121 may be eliminated and the wires 125, 126 fastened directly to the masses. The arms merely serve to increase the lever arm for transmitting the torque from the masses to the wires.

The oscillators for the wires 125 and 126 may be substantially identical to that illustrated in Fig. 4 for the wires 25 and 26 in Fig. 1, and also the output circuit of Fig. 5 may likewise be employed for providing the measure of angular accelerations detected by the apparatus of Fig. 7.

In order to provide initial tension on the wires 125 and 126, a spring 122 is coupled between the masses in such a way as to exert a torque on each mass in opposite directions about the sensitive axis $y-y$ to thereby maintain the wires 125 and 126 under normally equal tensions. It is possible, of course, to use an electromagnetic spring as in Fig. 6 or, by suitable alteration of design, to employ a torque motor for producing opposing torques on the masses and hence maintain tension in the wires 125 and 126. This torque is transmitted to the masses through a pair of struts 123, 123' mounted on the masses 116, 117 to which the ends of the spring are attached.

In order that vibratory coupling between the wires 125, 126 through spring 122 and the masses 116 and 117 be eliminated, a pair of vibratory reeds or energy absorbers 127, 127' is disposed within a chamber 128 formed by the construction of the mass 116, and vibratory reeds 129, 129' are similarly disposed within a chamber in mass 117. Each of the reeds comprises a flexible spoke radially extending in opposite directions from the mass support shaft, and each carries at its outer or free end a mass 131. The spokes constitute springs for flexibly supporting the masses 131 with respect to their respective masses, and their lengths are so adjusted that the spring-mass combination constitutes a mechanical band rejection filter tuned to the fundamental vibration frequency of the wires 125 and 126 for absorbing vibration energy of the masses at this frequency. Similarly, the two reeds 129, 129' associated with mass 117 likewise constitute a mechanical band rejection filter tuned to the frequency of vibration of the wire 125. If desired, or if necessary, any required number of reeds may be employed, preferably symmetrically disposed about the axis $y-y'$.

The operation of the apparatus illustrated in Fig. 7 is believed to be clearly apparent from the foregoing description thereof. Angular acceleration forces acting on the masses 116 and 117 will produce an increase or decrease in tension of the wires 125, 126, the difference in frequency of vibration therebetween being a measure of such angular acceleration as in the apparatus of Fig. 1.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Force-measuring apparatus comprising a substantially rigid frame, a member mounted on the frame responsive to the force, a pair of filaments connecting said member to the frame, said filaments extending on the frame in a direction substantially parallel to the direction along which the force is exerted, resilient means associated with said member for normally applying equal tensions to said filaments, means for vibrating said filaments at frequencies dependent upon the tensions applied thereto including means for vibrating said filaments in different vibratory modes having a predetermined ratio therebetween, and means responsive to said last-named means operable to provide a measure of the force exerted on said force responsive member changing the tension and related frequencies of vibration of each of said filaments.

2. Force-measuring apparatus comprising a substantially rigid frame, a member mounted on the frame responsive to the force, a pair of filaments connecting said member to the frame, said filaments extending on the frame in a direction substantially parallel to the direction along which the force is exerted, resilient means associated with said member for normally applying equal tensions to said filaments, means for vibrating one of said filaments in a first vibratory mode at a frequency dependent upon the tension supplied thereto by said resilient means and member, means for vibrating the other of said filaments in a second vibratory mode related to the first mode in a predetermined ratio at a frequency dependent upon the tension supplied thereto by said resilient means and member, and means responsive to the one and the other of said vibrating means operable in accordance with the change in the frequency of vibration of each of said filaments to provide a measure of the force exerted on said member.

3. An accelerometer comprising a substantially rigid frame, first and second acceleration responsive masses, first and second filaments each having one end thereof connected with each of said masses and the other end thereof connected to said frame, resilient means intercoupling said masses for applying equal tension to each of said filaments, a first oscillator coupled to one of said filaments for vibrating the filament in a first vibratory mode at a frequency dependent upon the tension applied thereto by said masses, a second oscillator coupled to the other of said filaments for vibrating the filament in a second vibratory mode related to the first mode in a predetermined ratio at a frequency dependent upon the tension applied thereto by said masses, and means responsive to said oscillators operable in accordance with change in the frequency of vibration of the first and second filaments to provide a measure of the response of said masses to acceleration.

4. An accelerometer as claimed in claim 3, in which said measuring means includes means for converting the frequencies of the vibrating modes of said oscillators to a substantially 1:1 ratio to obtain a direct comparison of the vibrating frequencies of the filaments.

5. Accelerometer apparatus comprising a substantially rigid housing, a mass mounted in said housing and responsive to accelerations of said housing relative thereto, a pair of conducting wires connecting said mass with said housing, said wires extending in directions substantially parallel to the direction along which an acceleration is effective, resilient means for applying normally equal tensions to said wires, oscillator means electrically coupled with and controlled by said wires for vibrating the same at frequencies dependent upon the respective tensions applied thereto, said oscillator means including magnetic means adjacent each of said wires for producing magnetic fields at predetermined positions along each of said wires, the magnetic fields produced along one of said wires causing vibration thereof in a first mode and along the other of said wires for producing vibration thereof in a second mode related to the first mode in a predetermined ratio to reduce vibratory intercoupling between said wires, and means responsive to change in the vibration frequency of said wires upon changes in the tensions thereof produced by acceleration of said housing relative to said mass to provide a measure of the acceleration causing the frequency change.

6. Apparatus as set forth in claim 5 wherein said measuring means includes means for converting the outputs of said oscillator means to frequencies bearing substantially a 1:1 ratio to provide a direct comparison of the frequencies of oscillation of the wires.

7. Apparatus as set forth in claim 5 wherein said oscillating means comprises a first oscillator with an output including the magnetic means for the one of the wires and a second oscillator with an output including the magnetic means for the other of the wires, and wherein said measuring means includes means for providing a direct comparison of the frequency of the outputs of said oscillators.

8. An angular accelerometer device comprising a substantially rigid frame, first and second acceleration responsive masses pivotally supported for rotation about an axis in said frame and responsive to angular accelerations effective about said axis, first and second filaments each having one end thereof connected with each of said masses and the other end thereof connected with said frame, and resilient means intercoupling said masses and tending to rotate said masses in opposite directions about said axis to thereby apply normally equal tension to each of said filaments, first and second oscillators respectively coupled with said filaments for vibrating the same at frequencies respectively dependent upon the tensions applied thereto, and means responsive to the frequency of said oscillators for measuring the respective changes in the frequency thereof upon respective changes in the tension applied to said filaments produced by angular acceleration acting between said masses and said frame to provide a measure of the acceleration.

9. Apparatus as set forth in claim 8 wherein said means for vibrating said filaments includes means for vibrating said filaments in different vibratory modes bearing a predetermined ratio therebetween to reduce vibratory intercoupling between said filaments through said resilient means.

10. Apparatus as set forth in claim 8 wherein at least one of said masses comprises a primary, substantially cylindrical mass at its periphery with its associated filament, and resilient means coupling said secondary mass with said primary mass and responsive to angular vibrations of said primary mass about said axis, said secondary mass and resilient means being tuned to the frequency of vibration of its associated filament and constituting a band rejection filter tuned to said vibration frequency to minimize vibratory coupling between said filaments.

References Cited in the file of this patent

UNITED STATES PATENTS

| 1,638,782 | Paton | Aug. 9, 1927 |
| 2,725,492 | Allan | Nov. 29, 1955 |
| 2,816,748 | Woestemeyer | Dec. 17, 1957 |
| 2,852,243 | Shepard | Sept. 16, 1958 |

FOREIGN PATENTS

| 527,257 | Canada | July 3, 1956 |
| 729,894 | Germany | Dec. 19, 1942 |
| 789,611 | Great Britain | Jan. 22, 1958 |